United States Patent [19]

Zimmermann et al.

[11] Patent Number: 5,372,767
[45] Date of Patent: Dec. 13, 1994

[54] METHOD FOR APPLYING A STOPPER TO A ROPE

[75] Inventors: Helmut Zimmermann, Kernen; Klaus-Martin Uhl, Esslingen; Hermann Hägele, Winnenden, all of Germany

[73] Assignee: Andreas Stihl, Waiblingen, Germany

[21] Appl. No.: 926,325

[22] Filed: Aug. 10, 1992

[30] Foreign Application Priority Data

Aug. 9, 1991 [DE] Germany .................. 4126350

[51] Int. Cl.⁵ .............. B29C 45/14; B29C 45/16; B29C 53/16
[52] U.S. Cl. .................... 264/154; 264/229; 264/255; 264/273; 264/294
[58] Field of Search ............ 264/154, 163, 273, 274, 264/294, 250, 251, 229, 254, 255

[56] References Cited

U.S. PATENT DOCUMENTS

| | | | |
|---|---|---|---|
| 2,868,186 | 1/1959 | Schnacke | 123/185 |
| 3,653,098 | 4/1972 | Lagarde et al. | 264/273 |
| 4,103,660 | 8/1978 | Reese | 123/179 K |
| 4,202,091 | 5/1980 | Ohnishi | 264/273 |
| 4,402,115 | 9/1983 | Moertel | 264/251 |
| 4,470,784 | 9/1984 | Piotrovsky | 264/278 |
| 4,495,740 | 1/1985 | Sarrazin et al. | 264/273 |
| 5,053,178 | 10/1991 | Butlin et al. | 264/273 |
| 5,091,131 | 2/1992 | Schumacher et al. | 264/273 |

Primary Examiner—Jan H. Silbaugh
Assistant Examiner—Angela Y. Ortiz
Attorney, Agent, or Firm—Walter Ottesen

[57] ABSTRACT

A stopper for a rope which is injection molded on the rope. The stopper has a sleeve-like shape and surrounds the rope without play and prevents an axial slippage of the stopper from the rope. A strut is formed as one piece with the stopper and extends radially through the inner diameter of the rope. Also a method of forming a stopper on a rope is included.

16 Claims, 2 Drawing Sheets

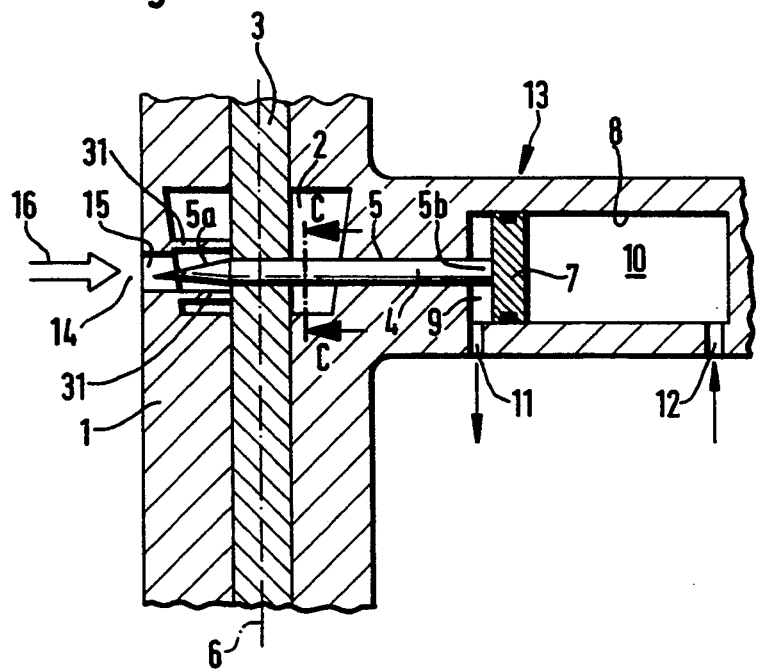
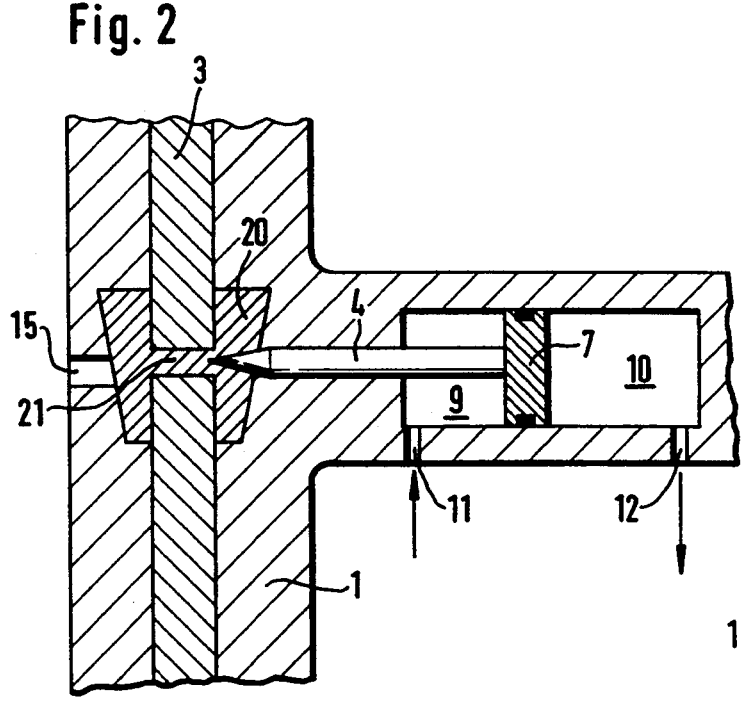
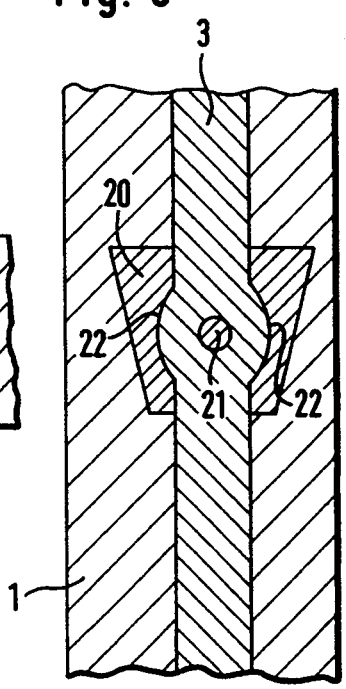

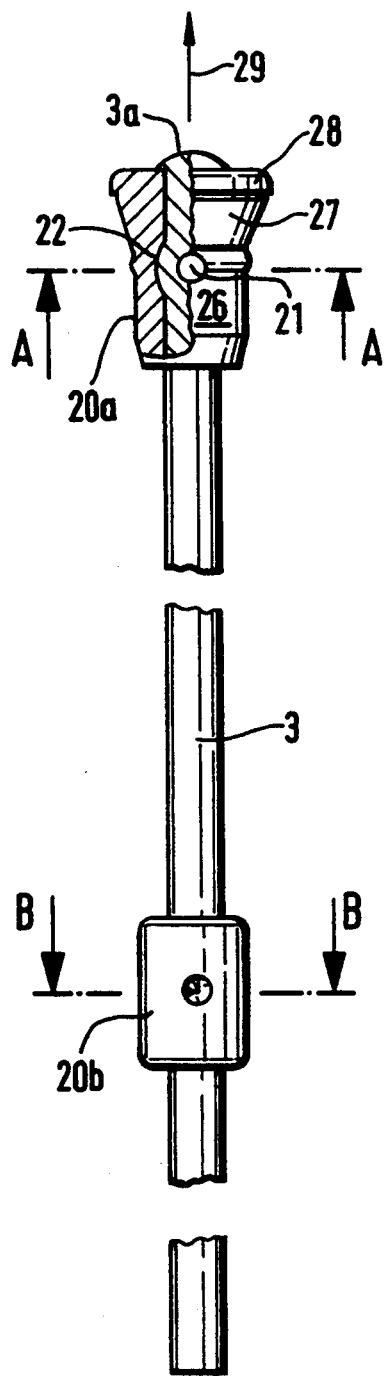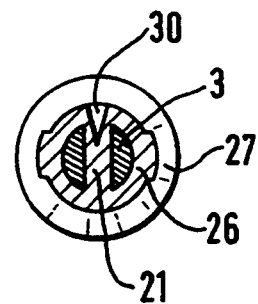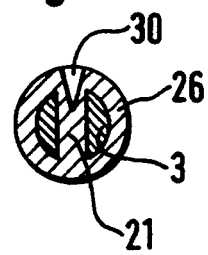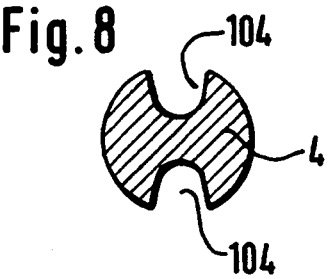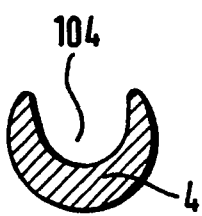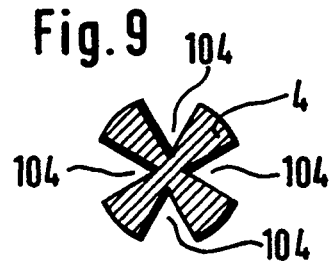

METHOD FOR APPLYING A STOPPER TO A ROPE

BACKGROUND OF THE INVENTION

In pull-rope starters, one end of the pull rope is fixed in the handle and, for this purpose, a rope stopper is attached to this rope end, for example, by clamping. The other end of the pull rope is then threaded through a bore in the handle and connected to the pull-rope drum. Because of the yank-like tension load when starting an internal combustion engine, the rope stopper often slips axially from the pull rope. For this reason, the operator ties a knot in the end of the pull rope in order to prevent slippage through the rope bore in the handle. However, the rope knot often extends beyond the handle and disturbs manipulation thereof. In many cases, the support for the knot is recessed in the handle so that the knot becomes pulled into the handle and becomes tightly clamped. If the pull rope tears apart, the knot must then be pressed out of the recess with difficulty.

SUMMARY OF THE INVENTION

It is an object of the invention to provide a pull-rope stopper so that it is held in a manner that it cannot be axially separated from the rope.

The stopper is seated without play on the pull rope and extends through the rope with its inner strut whereby a form-fit between the pull rope and the stopper is formed. The stopper can no longer axially slip from the rope without destroying the rope or the strut.

The rope stopper is applied to the pull rope pursuant to the method of the invention. In this method, the rope is first advantageously tensioned in the axial direction and placed in an injection mold so that the pull rope passes through the hollow space of the injection mold. A pin lying transversely to the rope is then pushed through the rope whereby the rope bulges to the sides of the pin. The form is then completely injected with material via an injection channel and the material is then allowed to cool down until it arrives at a state between a dough-like consistency and slightly hardened. The sleeve-like pull-rope stopper then encloses the lateral bulges of the pull rope so that the stopper is held with respect to the axial direction of the rope in a form-tight manner. Thereafter, the pin is withdrawn from the hollow space while at the same time feeding hot injection material. For this reason, hot material flows in behind the pin at the same time that it is withdrawn so that no hollow spaces can form. When the pin is completely withdrawn from the hollow space, the stopper is fully formed at least when the first degree of curing is reached. After curing, the strut constitutes a homogeneous part of the stopper and fixes the stopper axially and in a rotational direction in a form-tight manner on the pull rope.

At least one mold channel running in the longitudinal direction of the pin is provided between the pin and the rope which becomes filled during injection of the hollow space while forming a preliminary strut. The rope is then stiffened by the preliminary strut so that when the pin is withdrawn, the pass-through provided by the pin is not closed again because of the pressure of the material when the rope is pressed together. The pass-through is reliably filled with injection material which then flows thereinto even when time delays occur during injection.

BRIEF DESCRIPTION OF THE DRAWINGS

The invention will now be described with reference to the drawings wherein:

FIG. 1 is a section view taken through an injection mold showing the pull rope in place and a pin extending through the rope;

FIG. 2 is a section view corresponding to that of FIG. 1 wherein the pin is almost completely withdrawn and material fills the mold;

FIG. 3 is a further section view through the injection mold taken along a cutting plane extending perpendicularly through the pin;

FIG. 4 is an elevation view of the pull rope with the stopper applied thereto;

FIG. 5 is a section view taken along line A—A of FIG. 4;

FIG. 6 is a section view taken along line B—B of FIG. 4;

FIG. 7 is a section view taken through the pin along the line C—C of FIG. 1;

FIG. 8 is a section view along line C—C of FIG. 1 through a pin having another configuration; and, FIG. 9 is a section view taken along C—C of FIG. 1 through a pin having still another configuration.

DESCRIPTION OF THE PREFERRED EMBODIMENTS OF THE INVENTION

The injection mold 1 shown in section includes an inner hollow space 2 through which a rope 3 runs which has been placed in the injection mold. The rope 3 is held in axial tension in the injection mold so that it cannot deviate when penetrated by a pin 4 which is preferably round. Two supporting pins 31 fixed to the mold are provided for supporting the segment of the rope lying in the hollow space 2. The supporting pins 31 are disposed on the side of the injection mold 1 lying opposite to the pin 4. The supporting pins extend up to the outer rope periphery and lie spaced from each other in the longitudinal direction of the rope 3.

The pin 4 or more specifically the tip thereof exits precisely between the support pins 31. The pin 4 lies transversely to the longitudinal axis 6 of the rope and is held so as to be displaceable in a bore 5 in the injection mold 1. At least the end 5a of the pin 4 facing toward the hollow space 2 is made of metal and is preferably configured as a needle tip; whereas, the end 5b of the pin 4 facing away from the hollow space 2 is connected to an actuator 13. In the embodiment shown, the actuator 13 includes a piston 7 which partitions a cylinder 8 into a first pressure chamber 9 and a second pressure chamber 10. The pressure chamber 9 includes a feed and runoff bore 11 and the pressure chamber 10 includes a feed and runoff bore 12 for a hydraulic or pneumatic pressure medium. The pin is displaced in the longitudinal direction by supplying and withdrawing pressure medium via the bores 11 and 12. In the embodiment shown, the pin 4 is moved precisely radially to the rope 3. The pin and the longitudinal center axis 6 of the rope 3 conjointly define a right angle and the pin penetrates the rope 3 preferably precisely in the center axis 6. The actuator 13 can be advantageously actuated electrically or manually.

An injection channel 14 is provided on the opposite side of the hollow chamber 2 and is in alignment with the journalling bore 5 for the metal pin 4. This injection channel 14 is configured as a hot channel. That means, that the material to be injected remains hot up to opening bore 15. The diameter of the injection channel 14 is configured to be greater than the diameter of the pin. At the start of the injection procedure, the tipped forward metal end 5a of the pin 4 lies in the opening bore 15 of the injection channel 14.

After the rope 3 has been placed in the injection mold 1 and is held therein so as to be axially tensioned, the pressure chamber 10 is charged with a pressure medium via the feed and runoff bore 12 whereby the piston 7 is displaced in the direction toward the hollow space 2 and the pin 4 penetrates and passes through the rope 3 transversely to the longitudinal axis thereof and preferably precisely radially thereto. Since the rope is held axially under tension in the injection mold 1 and is braced on the support pins 31, the free rope segment lying in the hollow chamber 2 cannot deviate in the direction of movement of the pin. When the metal tip of the pin 4 penetrates the rope 3, the rope threads are pushed laterally outwardly without being destroyed. The pin 4 is pushed in so far until its tip 5a projects clearly into the opening bore 15. Then, material, preferably plastic, is injected at high pressure through the injection channel 14 in the direction of arrow 16 and the hollow chamber 2 is completely filled. Preferably, the pressure chamber 10 is charged with pressure during the injection procedure in order to prevent the pin 4 from being pushed back by the material flowing in under high pressure.

The completely filled hollow space is then cooled or a delay is provided until the material has cooled down to a state in the range between a dough-like state and a slightly cured state. A plug is formed in the opening bore 15 by the cooling material. The pill 4 is now withdrawn from the hollow chamber 2 (FIG. 2). In this process, the plug is torn from the opening bore 15 and the pin 4 is pulled back through the rope into approximately the position shown in FIG. 2 while, at the same time, free-flowing hot injection material flows in. Since the material in the hollow chamber has a certain stability because of its state of curing, the hollow space caused by the pin 4 remains when the pin 4 is withdrawn and is completely filled when the pin 4 is withdrawn by the inflowing hot material. The inflow of hot material takes place in such a manner that no hollow space and no air pockets or the like can form. A strut 21 running across the inner diameter of the sleeve-like stopper 20 is formed by the withdrawal of the pin 4 and the inflow of the hot material via the injection channel 14. The strut 21 is homogeneously joined to the material of the stopper 20 so that the strut 21 and the stopper 20 conjointly define a single injected component. The stopper 20 remains in the injection mold for curing and preferably under pressure and is completely formed after a predetermined partial curing.

The stopper 20 is connected in a form-tight manner to the rope so that a slippage of the stopper 20 from the rope 3 is not possible without destroying the rope or the stopper.

As shown in FIG. 3, the rope 3 is laterally displaced with the penetration of the pin 4 so that bulges 22 are formed laterally of the strut 21. This is in addition to the form-tight strut 21 running through the rope 3. These bulges are surrounded by the sleeve-shaped stopper and effect a form-tight interengagement in the axial direction of the rope 3 whereby the stopper is further secured on the rope. A fusion of the rope material with the injection material preferably does not take place.

FIG. 4 shows a segment of the rope with the stoppers 20a and 20b. The stopper 20a injection molded on the rope end has a cylindrical base body 26 which is conically expanded at the end thereof facing toward the end 3a of the rope and ends in a collar 28. The conical section 27 as well as the collar 28 lie in a support in the handle which is correspondingly configured and so fix the handle on the rope 3 in pull direction 29. At its other end, the base body is configured so as to be slightly tapered.

The strut 21 of the stopper 20a lies just ahead of the conical section 27 in the base body 26. The rope bulges 22 are substantially accommodated in the base body 26. FIG. 5 shows a section through the stopper 20a at the elevation of the strut 21. A small recess 30 remains in the base body of the stopper 20a because of the withdrawn metal tip.

The stopper 20b is injection molded on the rope 3 and comprises only the cylindrical base body 26 having edges which are interrupted. The strut 21 is provided at the axial center of the base body 26 as shown in FIG. 6.

The pin 4 preferably has at least one axial slot 104 running in its longitudinal direction as shown in FIG. 7. The slot extends to the tip 5a and has a length which is at least slightly greater than the diameter of the rope 3. In the position shown in FIG. 1 where the pin has penetrated the rope 3, the axial slot 104 and the rope 3 conjointly delimit a channel passing through the rope which is completely filled when injecting the hollow space 2 with injection material. In this way, a preliminary strut is formed which stiffens the rope segment lying in the hollow space so that, when the pin 4 is withdrawn, a hollow space remains passing through the rope 3 even when free-flowing material does not immediately enter. In the sequence of method steps, time errors which occur cannot disadvantageously restrict the formation of the strut.

In FIG. 7, the pin 4 is configured so as to have an eccentric base body similar to a hollow needle. In another embodiment, the pin 4 is configured to have a cylindrical base body in which two axial slots 104 are formed symmetrically to the longitudinal center axis (FIG. 8).

In still another embodiment according to FIG. 9, V-shaped axial slots 104 are formed in the cylindrical base body of the pin 4 with these axial slots lying at the same spacing from each other in the peripheral direction. In the embodiment of FIG. 9, four axial slots 104 are provided so that an approximately star-shaped cross section of the pin 4 is provided.

In all embodiments, it is essential that the axial slot be so configured that the rope fiber material cannot completely fill the axial slot 104 even under pressure. Rather, the fiber material of the rope should only delimit the axial slot so that the form channel passing through the rope is filled during injection and so that preliminary struts stiffening the rope in this region can be formed.

It is understood that the foregoing description is that of the preferred embodiments of the invention and that various changes and modifications may be made thereto without departing from the spirit and scope of the invention as defined in the appended claims.

What is claimed is:

1. A method of applying a sleeve-shaped stopper to a rope, the method comprising the steps of:

placing the rope in an injection mold defining a hollow chamber in such a manner that a segment of the rope passes through the hollow chamber;

pushing a pin, which is mounted transversely to the rope, through the segment of the rope disposed in said hollow chamber;

injecting material into said hollow chamber of said injection mold via an injection channel so as to completely fill said hollow chamber with said material to form said stopper while said pin remains in said segment;

cooling said material until said material reaches a state between a state where the material has a consistency of dough and a slightly solidified state while continuing to keep said pin in said segment;

withdrawing said pin from said hollow chamber, thereby leaving a void in said material, while at the same time supplying free-flowing hot injection material to said void left by said pin thereby forming a strut through said segment which homogeneously joins to said stopper; and, removing said rope with said stopper from said mold after said material has at least partially solidified.

2. The method of claim 1, wherein said pin is pushed precisely radially through said rope.

3. The method of claim 1, wherein said rope is held in said injection mold so as to be axially tensioned.

4. The method of claim 1, wherein said hollow chamber has a side lying opposite said pin and supporting pins are provided on said side for radially supporting said rope; and, the supporting pins are spaced from each other in a longitudinal direction of said rope.

5. The method of claim 1, said rope and said pin conjointly delimiting at least one channel extending in a longitudinal direction of said pin; and, further comprising the step of filling said channel with said material when injecting said material into said hollow chamber to thereby form a preliminary strut.

6. The method of claim 2, wherein pressure is applied to said stopper for curing.

7. The method of claim 1, wherein the injected material is plastic.

8. The method of claim 1, wherein the step of withdrawing said pin is carried out with an actuator which is hydraulically or pneumatically driven.

9. A method of applying a sleeve-shaped stopper to a rope, the method comprising the steps of:

placing the rope in an injection mold defining a hollow chamber in such a manner that a segment of the rope passes through the hollow chamber;

pushing a pin, which is mounted transversely to the rope, through the segment of the rope disposed in said hollow chamber;

injecting material into said hollow chamber of said injection mold via an injection channel so as to completely fill said hollow chamber with said material;

cooling said material until said material reaches a state between a state where the material has a consistency of dough and a slightly solidified state;

withdrawing said pin from said hollow chamber, thereby leaving a void in said material, while at the same time supplying free-flowing hot injection material to said void left by said pin;

removing said rope with said stopper from said mold after said material has at least partially solidified;

providing said injection channel to lie opposite said pin and to have an opening communicating with said hollow chamber; and, said pin being pushed through said rope up to approximately the opening of said injection channel.

10. The method of claim 9, wherein said pin is pushed precisely radially through said rope.

11. The method of claim 9, wherein said rope is held in said injection mold so as to be axially tensioned.

12. The method of claim 10, wherein said hollow chamber has a side lying opposite said pin and supporting pins are provided on said side for radially supporting said rope; and, the supporting pins are spaced from each other in a longitudinal direction of said rope.

13. The method of claim 9, said rope and said pin conjointly delimiting at least one channel extending in a longitudinal direction of said pin; and, further comprising the step of filling said channel with said material when injecting said material into said hollow chamber to thereby form a preliminary strut.

14. The method of claim 10, wherein pressure is applied to said stopper for curing.

15. The method of claim 9, wherein the injected material is plastic.

16. The method of claim 9, wherein the step of withdrawing said pin is carried out with an actuator which is hydraulically or pneumatically driven.

* * * * *